July 30, 1957 H. H. NORMAN 2,800,928
APPARATUS FOR FORMING SPRINGS
Filed May 25, 1953 10 Sheets-Sheet 1

HARRY H. NORMAN
INVENTOR.

BY Hazard & Miller

ATTORNEYS

HARRY H. NORMAN
INVENTOR.

BY Hazard & Miller
ATTORNEYS

HARRY H. NORMAN
INVENTOR.

BY Hazard & Miller

ATTORNEYS

July 30, 1957  H. H. NORMAN  2,800,928
APPARATUS FOR FORMING SPRINGS
Filed May 25, 1953  10 Sheets-Sheet 4

HARRY H. NORMAN
INVENTOR.

BY Hazard & Miller

ATTORNEYS

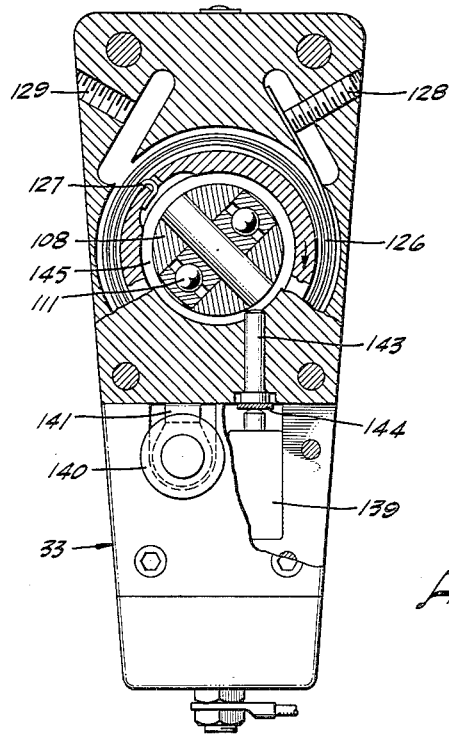
FIG. 8.
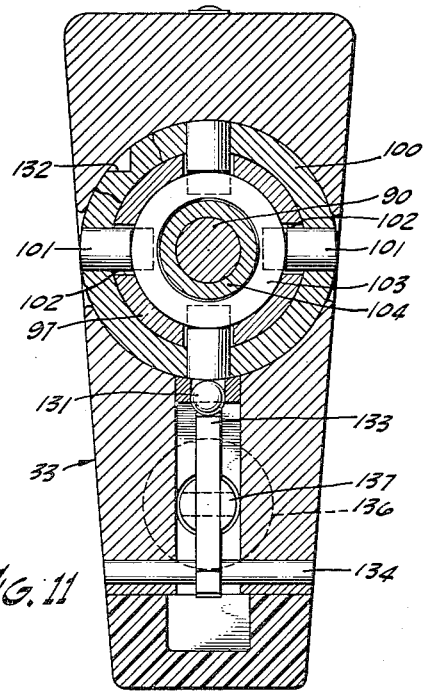
FIG. 10
FIG. 11
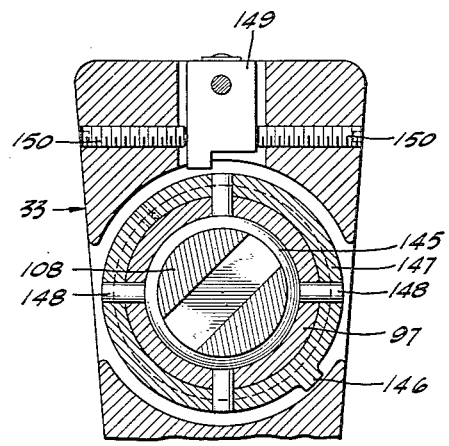
FIG. 9.
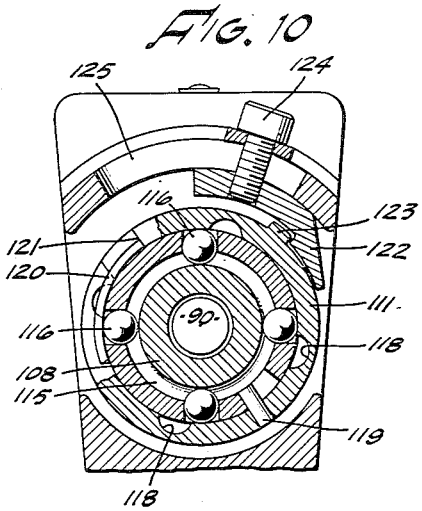
HARRY H. NORMAN
INVENTOR.
BY Hazard & Miller
ATTORNEYS

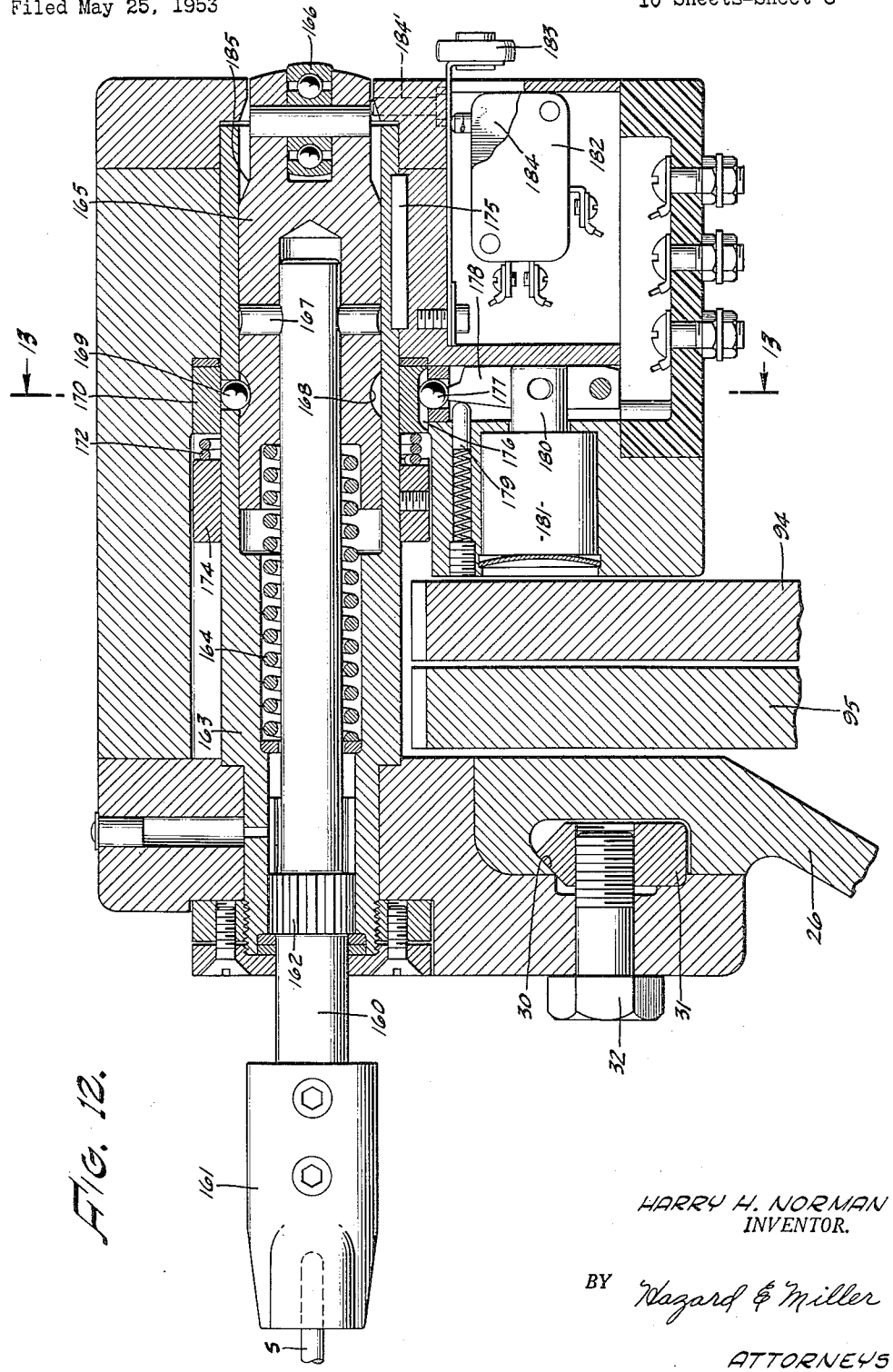

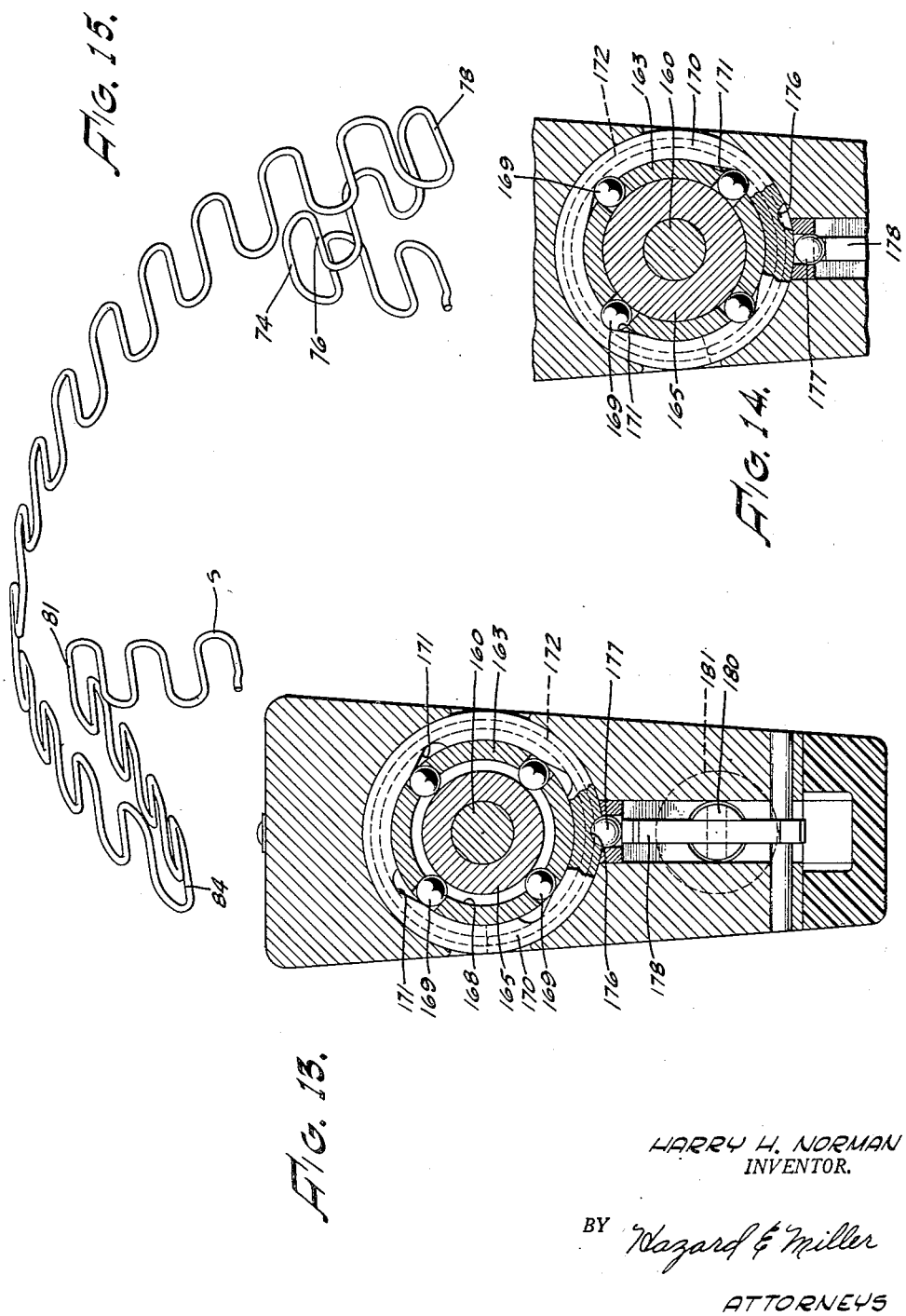

July 30, 1957 H. H. NORMAN 2,800,928
APPARATUS FOR FORMING SPRINGS
Filed May 25, 1953 10 Sheets-Sheet 10

HARRY H. NORMAN
INVENTOR.

BY Hazard & Miller
ATTORNEYS

United States Patent Office 2,800,928
Patented July 30, 1957

2,800,928

APPARATUS FOR FORMING SPRINGS

Harry H. Norman, Los Angeles, Calif., assignor to Zig Zag Spring Company, a partnership, Los Angeles, Calif.

Application May 25, 1953, Serial No. 357,066

8 Claims. (Cl. 140—71)

This invention relates to apparatus for forming springs from longitudinally arched sections of sinuously formed wire.

In my copending application Serial No. 781,953, filed October 24, 1947, now Patent No. 2,645,252, issued July 14, 1953, there is disclosed a machine for forming straight wire stock into sinuously shaped wire which is longitudinally arched and which is cut to length. The sections of wire thus produced have a plurality of lateral bars or reaches connected to each other at their ends by semicircular ends or loops. Each section produced by the machine is longitudinally arched on a substantially uniform curve.

The apparatus embodying the present invention is designed to receive the sections of wire thus formed and to bend them in various manners to produce the desired shape of spring therefrom. It will be understood, however, that longitudinally arched sections of sinuously shaped wire may be produced in any manner in so far as the present invention is concerned. The present apparatus relates to the bending or the formation of a spring from the sections of arched sinuous wire.

A primary object of the invention is to provide a machine into which sections of arched sinuous wire may be consecutively fed. Bending heads and holding heads are automatically advanced by the machine into engagement with the end loops at the sides of the sinuous wire sections and the bending heads are then rotated to effect a twisting of certain of the lateral bars of the sinuous wire section. In this manner the uniformly arched section of sinuous wire may be bent into certain desired shapes to produce a desired type of spring. In some instances the spring thus produced by the machine consists of a longitudinally arched sinuous wire spanning section having integral therewith at the ends thereof formations referred to in the industry as "fishmouths." In other instances the wire section may be shaped into the form of Z's, N's, M's, W's, and the like. In still other instances certain convolutions of the sinuous wire section are reversely folded on themselves so as to provide integral coils at the ends of the spanning section. The present apparatus is so designed that the location of the bending heads and holding heads may be adjusted along the length of the sinuous wire section fed into the machine and the amount of rotation given to the various bending heads may likewise be adjusted so that any one of a number of different spring formations may be produced. After the bending operation is completed the bending heads and holding heads are caused to automatically release the wire and drop it in its finished shape.

More specifically, an object of the invention is to provide a machine having the above mentioned characteristics wherein bending heads operable upon the sinuous wire section are caused to perform their functions progressively or in sequence, that is, bending heads which engage the forward end of the arched sinuous wire section fed into the machine will perform their bending operations progressively from the forward end toward the center of the wire section. Each head after it completes its operation releases the wire so as not to interfere with the movement of the wire while it is being acted upon by a succeeding bending head. Those bending heads which engage and are effective on the trailing end of the wire section are effective thereon progressively or successively from the trailing end toward the center. Each of these heads likewise disengages the wire after it completes its bending operation so as not to interfere with the wire movement while the wire is being operated upon by a succeeding bending head.

Still another object of the invention is to provide an apparatus capable of receiving and bending arched sinuous wire sections of various lengths inasmuch as the length of arched sinuous wire section fed into the machine may vary to meet the requirements of different springs.

Still another object of the invention is to provide a machine having the above mentioned characteristics which is so designed that it is capable of receiving and forming sinuous wire sections wherein the lateral bars or reaches are usually but not necessarily perpendicular to the length of the section.

Another object of the invention is to provide an apparatus of the character above described wherein the bending heads and holding heads form parts of separate units each of which may be shifted from place to place on supporting drums so that the locations of the bends made thereby in the wire section may be adjusted or altered to meet various demands. These units are so designed that the amount of bending performed by each bending head is variable.

With the foregoing and other objects in view, which will be made manifest in the following detailed description and specifically pointed out in the appended claims, reference is had to the accompanying drawings for an illustrative embodiment of the invention, wherein:

Figure 6:
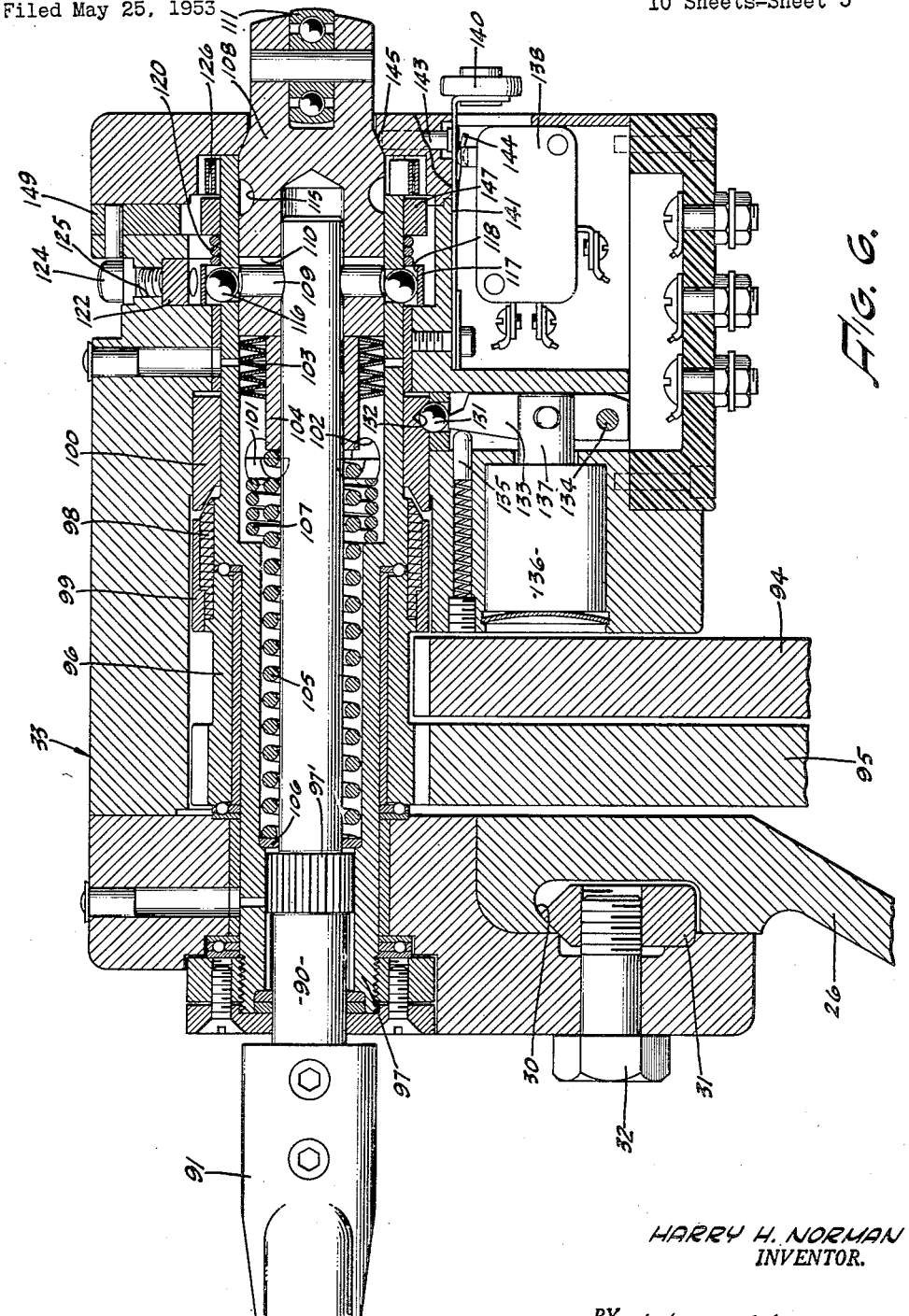
Fig. 6 is a vertical section through one of the units including a bending head illustrating the parts of the unit in the position assumed thereby prior to the formation of a bend in the wire.
Figure 7:
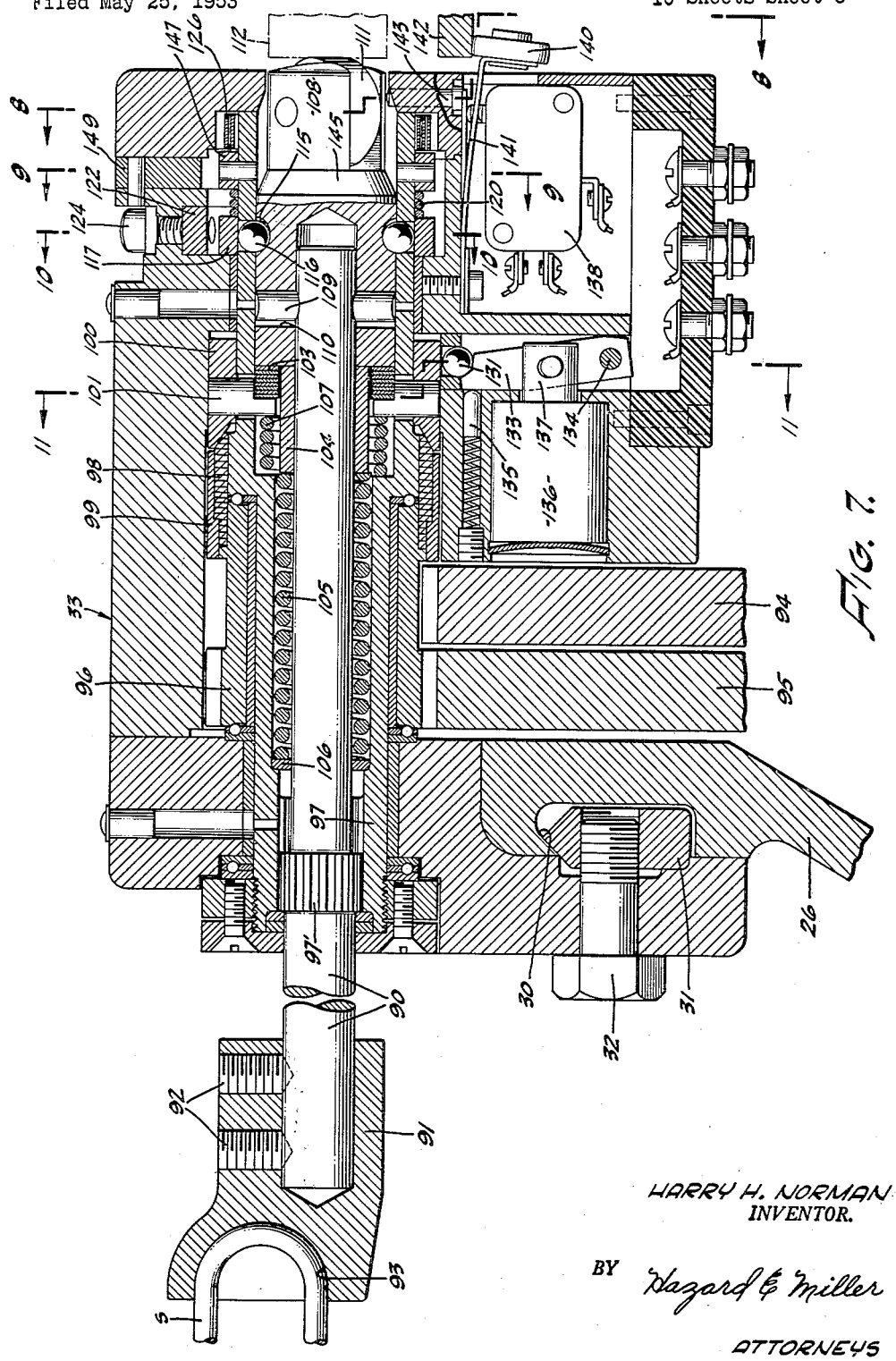
Fig. 7 is a view similar to Fig. 6 but illustrating the bending head in the position assumed thereby at the completion of a bending operation on the sinuous wire.
Figure 16:
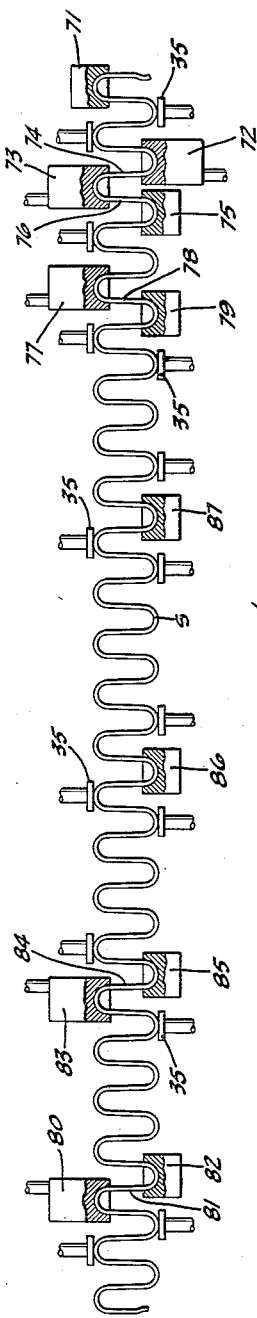
Figure 17:
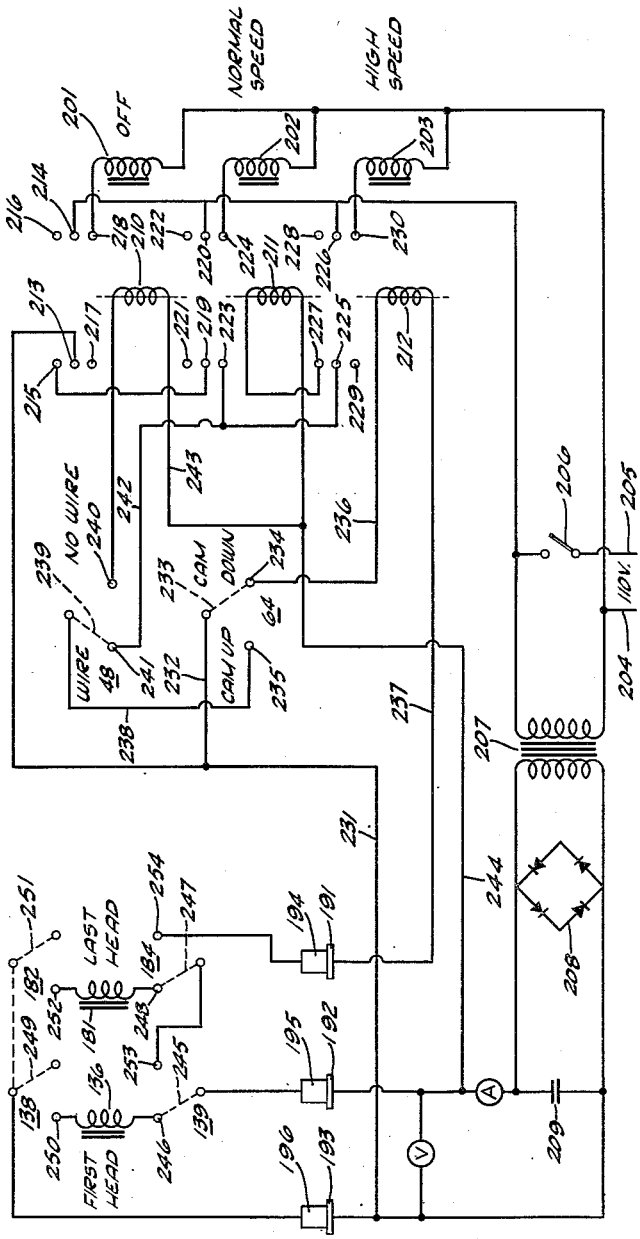

Figs. 8, 9, 10 and 11 are vertical sections taken on the lines 8—8, 9—9, 10—10, and 11—11, respectively on Fig. 7 in the direction indicated;

Fig. 12 is a sectional view similar to Fig. 6 but illustrating one of the holding heads and the unit associated therewith;

Fig. 13 is a vertical section taken substantially upon the line 13—13 upon Fig. 12 in the direction indicated;

Fig. 14 is a partial view in vertical section illustrating a portion of Fig. 13 but showing the parts in a shifted position;

Fig. 15 is a perspective view of one form of completed spring produced by the machine from an arched section of sinuous wire;

Fig. 16 is a development illustrating the sinuous wire in plan and illustrating the various bending heads and holding heads in engagement therewith in those positions required to produce the spring illustrated in Fig. 15; and Fig. 17 is a wiring diagram of the apparatus.

Referring to the accompanying drawings wherein similar reference characters designate similar parts throughout, the machine embodying the invention consists of a suitable supporting frame indicated at 10 which supports an electrical motor 11 which drives a hydraulic pump 12. The outlet from this pump is connected to a conduit 13 which, in turn, is connected to two spaced hydraulic motors 14 and 15. The return line for liquid from these motors is indicated at 16. The two motors 14 and 15 are arranged adjacent the ends of a shaft 17 that extends transversely across the frame. The structure adjacent each end of the shaft is identical and consequently only a little more than one-half of the shaft has been illustrated in Fig. 3, it being understood that the structure shown in this figure is duplicated adjacent the other end thereof. Each motor 14 and 15 drives a stub shaft, the stub shaft for the motor 14 being indicated at 18 on Fig. 3. This stub shaft has two pinions 19 and 20 keyed thereon and, if desired, these may be integral with each other as shown. The pinion 19 meshes with a gear 21 that is keyed to the shaft 17. The pinion 20 meshes with a gear 22 that is keyed to a sleeve 23 that is rotatably mounted on the shaft 17 by means of bearings 24. The sleeve is also rotatably mounted within a part of the frame 10 by means of bearings 25. The gear ratio of the pinion 19 to the pinion 20 and consequently the gear ratio of the gear 21 to the gear 22 is such that the shaft 17 will be driven at one speed of rotation while the sleeve 23 will be driven at twice the speed of rotation of the shaft 17 but in the same direction.

Near the center of the shaft 17 there are two opposed drums 26 and 27. These drums may be integral with each other and connected to each other by means of a hub 28 that is pinned to the shaft 17 such as by a pin 29. The drums 26 and 27 have annular grooves 30 on their inner faces adapted to receive clamping members 31. Each clamping member is slidably adjusted around the groove in its drum but may be tightened and held in any adjusted position by means of a bolt 32. In some instances the bolt 32 serves to hold a bending head unit generally indicated at 33 on the drum. In other instances the bolt 32 serves to adjustably support a holding head unit on the drum and in still other instances the bolt 32 may serve to hold arms 34 on the drum which, in turn, support pads 35 in adjusted positions on the drum.

Between the two drums there is arranged an entering guide or chute 36 into which a section or cut length of longitudinally arched sinuous wire S may be fed. This chute is milled out intermediate its ends as indicated at 37 so that a notched wheel 38 may enter the chute. This wheel has on its periphery spaced teeth 39 which, as the wheel 38 rotates, engage the lateral bars or transversely extending portions of the sinuous wire and thus feed the wire through the chute 36 into the machine. The wheel 38 is driven by an electric motor 40 supported on the frame by a bracket 41 and the drive includes opposed plates 42 and 43 urged into clamping engagement with the sides of the wheel 38 by means of a spring 44. This forms a friction drive for the wheel 38, causing the wheel to continuously urge the section S to pass through the chute and into the machine. However, if the movement of the section S is arrested or retarded the friction drive afforded by the plates 42 and 43 merely allows slippage to take place so that the section S may have its forward movement arrested without damaging the wire. Whenever the section S is released for forward movement the friction of the friction drive causes the wheel 38 to resume its forward feed of the section S.

In the path of the section S there is arranged a latch 45. This latch is mounted for swinging movement and limited sliding movement on a pin 46 mounted on the frame of the machine. It is urged into its uppermost position by means of a spring 47 and in this position it engages the button of a microswitch 48 throwing the switch. The spring 47 also urges the latch into the path of the section S and into the path of a cam member 49. This cam member is mounted on a stem 50 that is radially slidable in a bracket 51 that is secured to a transversely extending yoke 52 mounted upon the two drums 26 and 27 and which extend therebetween. The stem 50 is urged into its outermost position by a compression spring 53, its outward movement being limited or restricted by a collar 54 which engages the bracket. When the cam member 49 is in its outermost position and is passing beneath the latch 45 it is capable of lifting the latch 45 out of the path of the section S, thus releasing the section and permitting it to be fed through the chute by the wheel 38. The cam member 49, in the course of its rotation with the drums, passes between two spaced rails 55 and 56 (see Fig. 3) and also between two spaced arcuate members 57 and 58 disposed immediately therebeneath. These arcuate members are pivotally mounted on the rails at 59 (see Fig. 2), that present cam-shaped bottom edges 60 which are engageable by rollers 61 rotatably mounted upon a transversely extending bolt 62 mounted on the stem 50. One of the arcuate members provides a shoulder 63 engageable with the button of a microswitch 64 mounted on one of the rails. As the drums rotate carrying with them the yoke 52 the stem 51 and the cam member 49, the rollers 61 will engage the cam edges 60 of the arcuate members, lifting these arcuate members and causing the shoulder 62 to effect a throwing of the microswitch 64.

Figure 1:
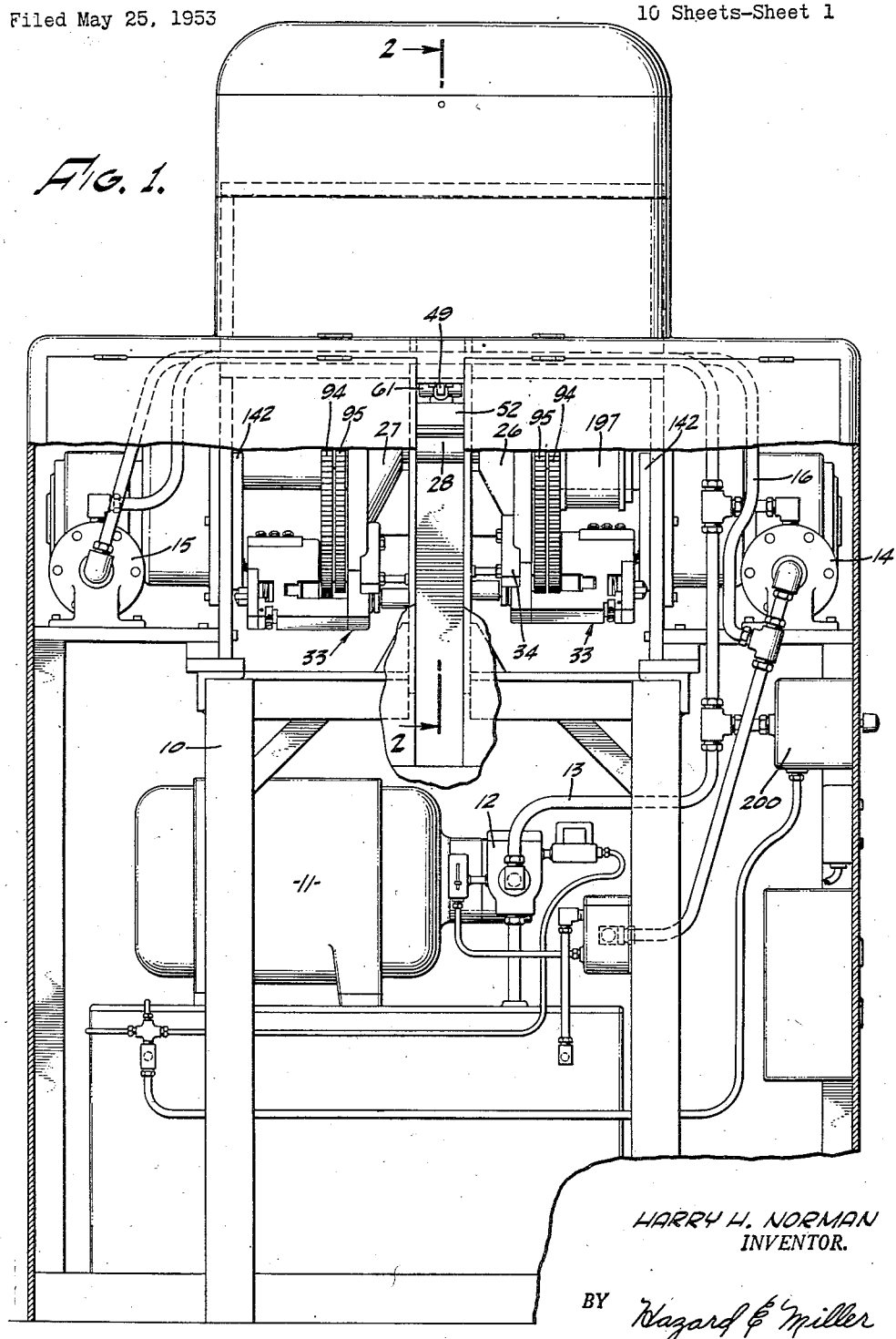
Figure 1 is a front view in elevation, parts being broken away, of a wire bending apparatus embodying the present invention.
Figure 2:
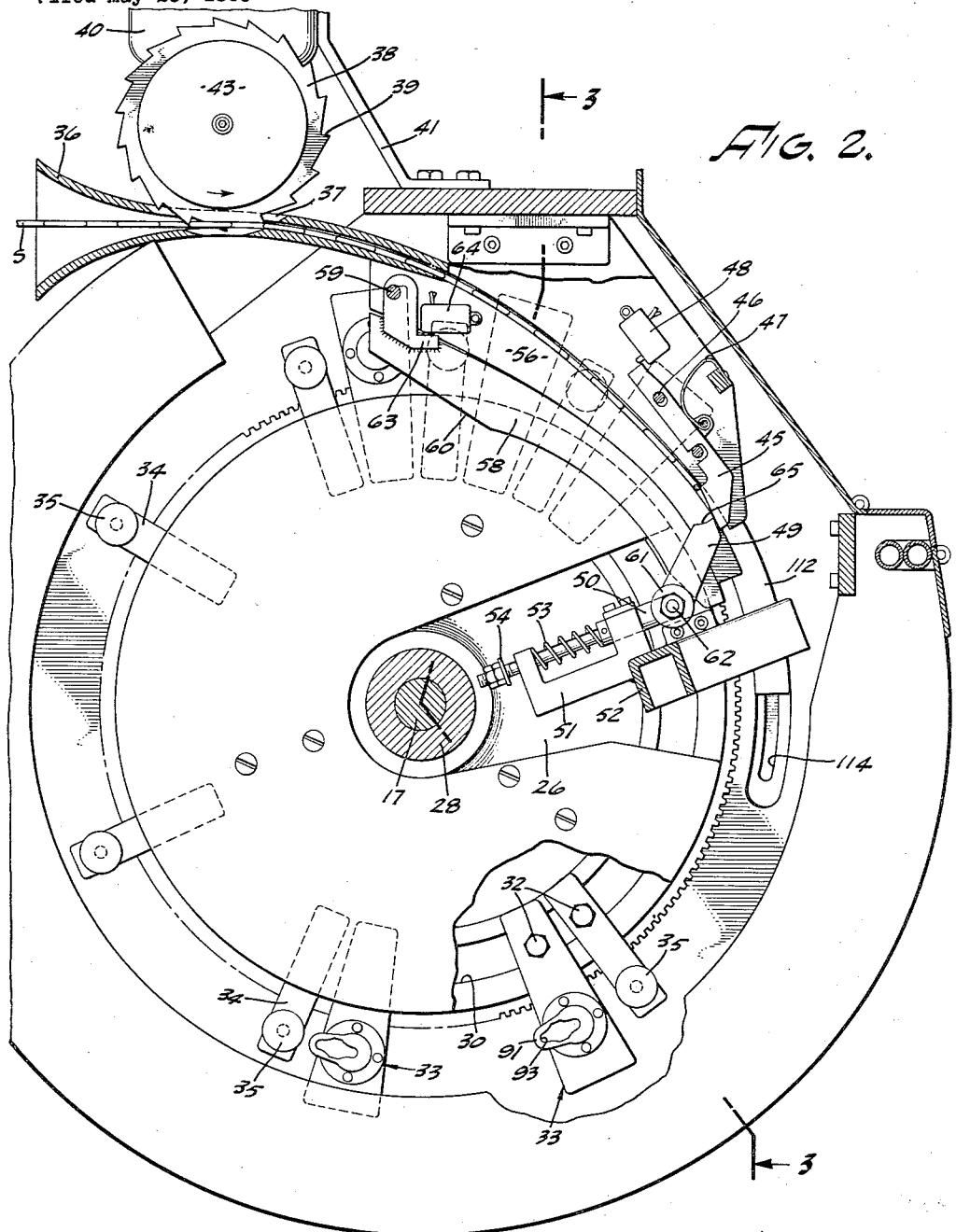
Fig. 2 is a partial view in vertical section taken substantially on the line 2—2 upon Fig. 1 in the direction indicated.

In order for the machine to continue to operate it is necessary for one or the other of the two microswitches 48 and 64 to be thrown. Whenever there is a section S in the chute pressing against the latch 45, this latch will be caused to slide downwardly against the action of the spring 47 and to disengage the button of the microswitch 48, causing this microswitch to return as previously explained. The returning of this switch is effective to cause the machine to continue to operate. However, whenever the feeding of sections S into the chute 36 is discontinued the spring 47 is effective to shift the latch 45 into its uppermost position engaging the button of the microswitch 48 and throwing this switch. Although this switch is thus thrown it is desirable to have the machine complete its cycle of operation and to complete the bending of the section that is between the two drums. Consequently, although the microswitch 48 may be thrown by the absence of any section S depressing the latch 45, the rollers 61 engage the arcuate cam members 57 and 58 and lift these cam members causing the shoulder 63 to throw the microswitch 64. The throwing of this switch causes the machine to continue to function until the rollers 61 pass beneath the trailing end of the cam edges 60, as depicted in Fig. 2, and in this position the cam members 57 and 58 will drop sufficiently to allow the microswitch 64 to return. If the mechanism is in the position shown in Fig. 2 and no section S is present to depress the latch 45, both mocroswitches 48 and 64 will open, causing the machine to stop at the end of its cycle. The end of the cycle occurs when the cam member 49 is in the position shown in Fig. 2.

If a section S is in the chute, as depicted in Fig. 2, and the latch 45 is lifted by the cam member 49 to release the section, the wheel 38 advances the section at a speed slightly greater than the speed of rotation of the drums so that the forward end of the section is pressed against the shoulder 65 on the cam member 49. The cam member 49 consequently performs a double function, the first of which is to lift the latch 45. The second function consists of locating the forward end of section S with relation to the drums and consequently, with relation to the bending heads, holding heads, and pads thereon. This latter is accomplished by the engagement of the forward end of the section S with the shoulder 65. In other words, if the section S, although longitudinally arched, that is fed into the machine has the shape and size shown in the development in Fig. 16, the shoulder 65 so positions the section between the drums that bends at the sides of the section will be opposite holding heads, bending heads, and pads so that the wire may be bent from its arched condition shown in plan on Fig. 16 into the condition shown in Fig. 15. In so bending the wire the holding head 71 quickly releases or disengages the wire and the bending head 72 rotates while the bending head 73 functions temporarily as a holding head, twisting the lateral bend 74, thus producing a bend in the wire section S at the bar 74 as illustrated in Fig. 15. Thereafter, the bending head 73 rotates relative to the holding head 75 to produce a very slight bend in the lateral bar 76, it being understood that the bending head 72, after performing its operation on the wire, is retracted so as to disengage the wire. As viewed in Fig. 16, all of those convolutions to the right of the bar 76 are swung by the bending head 73 somewhat as a unit while the lateral bar 76 is being twisted. When this operation is completed the bending head 73 and the holding head 75 are retracted so as to disengage the wire and the bending head 77 is effective to twist the lateral bar 78, the other end of which is held by the holding head 79, thus producing the bend in the wire as shown in Fig. 15 at the location of the lateral bar 78. While this bending operation is being performed, all convolutions to the right of the bar 78 as viewed in Fig. 16 swing as a unit as these convolutions have been disengaged by their respective bending and holding heads. Following the bending of the lateral bar 78 the bending head 80 is effective to bend the lateral bar 81 near the trailing end of the section S to produce the bend in the wire at the location of the bar 81 as viewed in Fig. 15. All convolutions in the wire to the left of the bar 81, as viewed in Fig. 16, swing as a unit about the bar 81 as a center while this twist is being placed in the bar 81. When the bending head 80 has completed its function it and the holding head 82 disengage the wire and the bending head 83 then becomes effective to twist the lateral bar 84, producing the bend in the wire at the location of the lateral bar 84 as viewed in Fig. 15. During this bending, all convolutions to the left of the bar 84 as viewed in Fig. 16 swing about the bar 84 as a unit. The holding heads 85, 86, and 87 then disengage the wire, allowing the bent section, bent into the completed form shown in Fig. 15, to drop from between the drums.

It will thus be understood that in converting the arched section S into the bent shape shown in Fig. 15 that bends are progressively made in the bars 74, 76, and 78 near the forward end of the section S, and when these are completed, bends are progressively made in the bars 81 and 84 at the trailing end of the section S which bends are progressively made from the trailing end of the section towards the center of the section.

Each of the bending head units 33 has a central or main shaft 90, see Figs. 6 and 7, on the outer end of which there is a bending club 91 mounted thereon, such as by set screws 92. Each bending head club has a semi-circular recess 93 formed in its outer end adapted to receive the semi-circularly curved portion at the end of a convolution in the wire. When the shaft 90 is rotated that lateral bar of the wire which is in alignment with axis of the shaft will be twisted. However, from an inspection of Fig. 15, it will be apparent that some lateral bars must be twisted in a forward direction and other lateral bars must be twisted in a rearward direction. Which bars are twisted forwardly and which are twisted rearwardly will, of course, depend upon the final shaping that it is desired to give to the spring. All bending head units are intended to be of substantially the same or duplicate construction, enabling the mere substitution or replacement of a sleeve to determine whether the shaft 90 is rotated in a forward direction to impart a forward twist to the lateral bar or to impart a rearward twist to the lateral bar.

Figure 3:
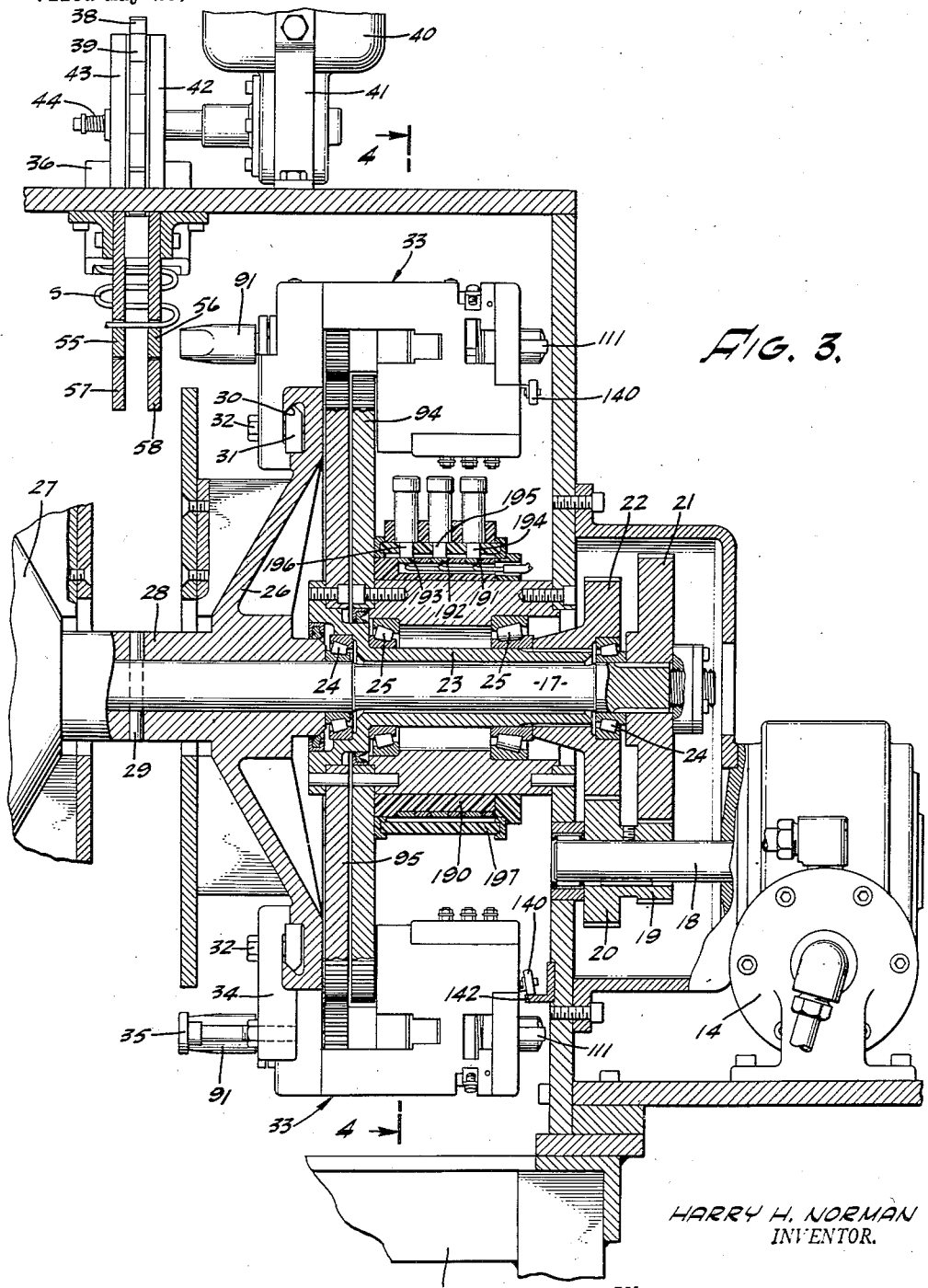
Fig. 3 is a sectional view taken substantially upon the line 3—3 upon Fig. 2 in the direction indicated.

To this end on the outer sides of the drums 26 and 27 there are stationary gears 94, see Fig. 3, which are rigidly bolted to the frame of the machine. Inwardly of these stationary gears there are rotary gears 95 which are rigidly mounted on the sleeve 23. Sleeve 23, as previously explained, is so geared as to rotate at twice the speed of the shaft 17 on which the drums 26 and 27 are mounted. Consequently, each bending head unit 33 as it is carried or revolved by means of its drum, moves at the speed of rotation of the drum relative to the stationary gear 94. On the other hand, as the movable gear 95 is rotating at twice the drum speed of rotation, the movable gear 95 rotates faster than the speed at which the bending head unit 33 is being carried by its drum. Consequently, by providing a driving connection between a shaft 90 of a bending head unit and a stationary gear 94, the shaft 90 can be caused to rotate in one direction to twist a lateral bar in a forward direction, and conversely, if a driving connection is provided between the shaft 90 and the movable gear 95 the shaft 90 may be rotated in a rearward direction to impart a rearward twist to a lateral bar.

Surrounding each shaft 90 of each bending head unit there is a sleeve 96 on the exterior of which there are pinion teeth shown in Figs. 6 and 7 as meshing with the movable gear 95. However, as above explained, this sleeve may be removed and replaced with a similar sleeve having pinion teeth arranged to mesh with the teeth on the stationary gear 94 when it is desired to rotate the shaft 90 in such a manner as to impart a forward twist to the lateral bar. In this manner, although each of bending head units 33 may be substantially identical in construction, one bending head unit can be converted from a forward bender to a rearward bender or vice versa by merely removing and replacing the sleeve 96 so that this sleeve can be driven by the gear 95 in one instance, or by the gear 94 in the other.

Between the shaft 90 and the sleeve 96 there is a sleeve 97 having a splined or feathered connection 97' with the shaft 90. Associated with the sleeve 96 is a spring clutch, the spring of which is indicated at 98. This spring is partially housed within a collar 99 that is pressed onto the sleeve 96. The convolutions of the spring 98 extend from the sleeve 96 onto a portion of the sleeve 97 and are adapted to be compressed by means of a clutch engager 100. This engager has a plurality of radial pins 101 extending radially inward through slots 102 in the sleeve 97. The inner ends of these pins are engageable by a Belleville spring 103 disposed about a sleeve 104 surrounding the shaft 90. The shaft 90 is urged into its retracted position by means of a compression spring 105 that is compressed between the sleeve 104 and a spring seat 106 on the interior of the sleeve 97. A compression spring 107 is also disposed between the pins 101 and an internal shoulder in the sleeve 97 urging the clutch engager 100 into disengaged position. When the clutch engager 100 is disengaged as depicted in Fig. 6, the sleeve 96 merely rotates with an idle rotation, the direction of rotation depending upon whether the sleeve 96 is driven by gear 95 or by gear 94. However when the clutch engager 100 has moved from the position shown in Fig. 6 to the position shown in Fig. 7, the spring clutch 98 forms a driving connection between the sleeve 96 and the sleeve 97 and rotation of the sleeve 97 is transmitted to the shaft 90 through the spline or feather connection at 97'.

Figure 4:
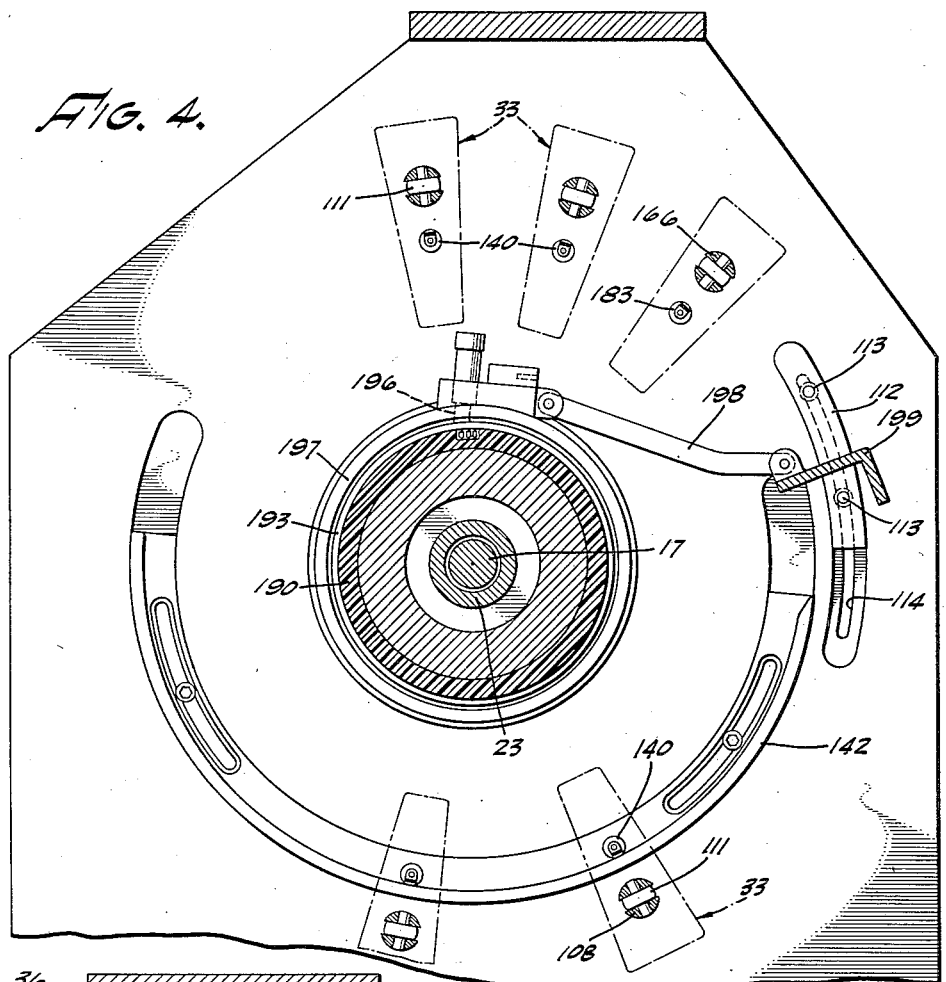
Fig. 4 is a vertical section taken substantially on the line 4—4 upon Fig. 3 in the direction indicated.
Figure 5:
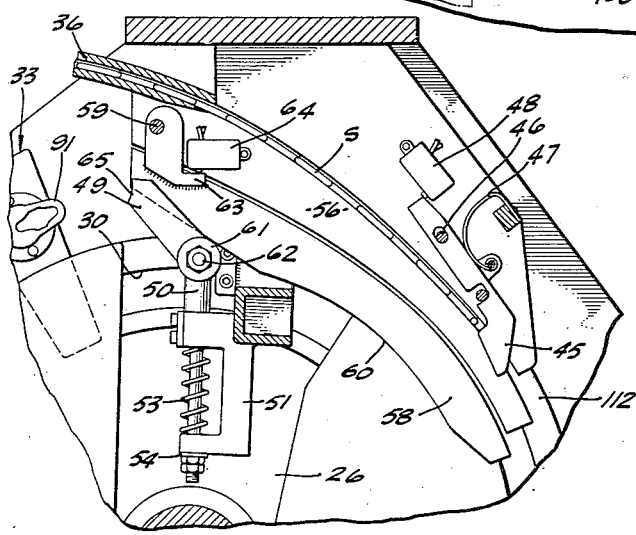
Fig. 5 is a partial view of a portion of the apparatus shown in Fig. 2 but illustrating the parts thereof in a different position from that shown in Fig. 2.

At the opposite end of the shaft 90 from the bending club 91 there is a plug 108. A diametrical pin 109 extends through the shaft 90 and through elongated slots 110 in the plug. Each plug 108 preferably has a roller 111 rotatably mounted thereon engageable with a cam 112, see Fig. 4. There are two cams 112, one being located on the frame of the machine on the outer side of the drum 26 and the other being located on the outer side of the drum 27. These cams are relatively short in length and are arcuate in form so as to be arranged in the path of the rollers 111 on the plugs of the various bending head units 33. The cams 112 are adjustably mounted by means of bolts or the equivalent indicated at 113 along the lengths of slots 114, and the function of each cam 112 is merely to press the plug 108 of each bending head unit inwardly, that is from the position shown in Fig. 6 to the position shown in Fig. 7. Each plug 108 has an annular groove 115 formed thereon in which balls 116 disposed in apertures in the sleeve 97 are receivable. Consequently, when a plug 108 is forced inwardly from the position shown in Fig. 6 to the position shown in Fig. 7 by the cam 112, the balls enter the groove 115 and temporarily lock the plug 108 in its inwardmost position somewhat as is depicted in Fig. 7. However, as the groove 115 is an annular groove the plug 108 is free to rotate with the shaft 90 while being held in this inwardmost position. The balls 116 are cammed inwardly or are urged inwardly into the groove 115 when the groove is opposite the balls by means of a surrounding ring 117, see Figs. 6, 7, and 10. This ring has recesses 118 on its interior which, when they are in alignment with the balls, will allow the balls to expand outwardly. The ring 117 has a pin and slot connection 119 with the sleeve 97. This pin and slot connection permits a limited rotation of the ring 117 relative to the sleeve 97 from a position where the recesses are in alignment with the apertures in which the balls 116 are disposed to a position as depicted in Fig. 10, wherein the recesses 118 are disaligned with respect to the balls. The ring 117 is constantly urged into the position shown in Fig. 10 with respect to the sleeve 97 by means of a torsion spring 120, one end of which is anchored to the housing of the bending head unit and the other end of which is engageable with a shoulder 121 on the side of the ring. Consequently, whenever the groove 115 is disposed opposite the balls the rotary effort imposed on the ring 117 by the spring 120 is such as to cause the recesses 118 to cam their respective balls into the groove 115 and pass to the disaligned position relative to the sleeve 97 as illustrated in Fig. 10. Externally of the ring 117 there is disposed an adjustable stop 122. This stop is engageable by a lug 123 on the exterior of the ring 117. Adjustment of the stop 122 is accomplished by means of a set screw 124 that is shiftable through a slot 125 and which when tightened will hold the stop 122 in any adjusted position. The position of this stop governs or limits the amount of rotation of the shaft 90 and consequently of the bending club 91. In other words, the position of the stop 122 governs the amount of twist given the particular lateral bar of the wire that is being twisted. Whenever the spring clutch 98 has been engaged to cause the sleeve 97 to be rotated by the sleeve 96 the ring 117 will rotate with the sleeve 97 until the lug 123 engages the stop 122 to arrest rotation of the ring 117. When the rotation of the ring 117 is thus arrested by the stop, sleeve 97 will continue to rotate relatively to the ring until such time as the balls 116 are in alignment with the recesses 118. Spring 105 of course is constantly urging the plug 108 into a position wherein the groove 115 is out of alignment with the balls or in other words, into a position shown in Fig. 6. Consequently, whenever the balls move into alignment with the recesses 118 after rotation of ring 117 has been arrested, the axial movement of the plug 108 causes the groove 115 to cam the balls 116 outwardly into the recesses 118.

Around the plug 108 there is a return spring 126. One end of this return spring is anchored on the sleeve 97 as indicated at 127. The other end of this return spring is anchored as by a set screw 128 to the housing of the bending head unit. When the sleeve 97 has been rotated by the sleeve 96 through the clutch 98 until the stop 122 has been engaged by the ring 117 and the balls 116 have been cammed into their recesses 118 the return spring 126 is capable of returning the plug 108 and consequently the shaft 90 to its original position as depicted in Fig. 6. However, as previously explained some bending clubs 91 may be rotated in a forward direction while other bending clubs may be rotated in a rearward direction, depending upon whether they are driven by the gears 94 or 95. Consequently, two set screws are provided for anchoring the end of the return spring 126, one such set screw being the set screw 128 and the other being indicated at 129. Consequently, if the shaft 90 has been rotated in one direction the spring 126 may be so arranged about the sleeve 97 as to return the sleeve after the sleeve 97 has been rotated in a clockwise direction as depicted in Fig. 8. On the other hand, if the sleeve 97 and its bending club 91 have been rotated in a counterclockwise direction, as depicted in Fig. 8, the spring 126 may be reversed and anchored by means of the set screw 129 so as to return the sleeve 97 after it has been rotated in a counterclockwise direction.

The forcing of the plug 108 inwardly by means of the cam 112 does not cause an immediate engagement of the spring clutch 98. This inward movement merely positions the groove 115 opposite the balls 116 and compresses the Belleville spring 103 against the pins 101. It also advances the bending club 91 into engagement with the wire to be worked upon involving a compression or loading of the spring 105. The spring clutch engager 100, however, is held out of engagement with the spring clutch 98 by means of a ball 131 which partially enters a recess 132 on the clutch engager. This ball is urged into such position as depicted in Fig. 6 by means of a cam 133 that is pivoted at 134. A spring actuated plunger 135 continually urges the cam 133 into a position pressing the ball 131 into the recess 132 which holds the clutch engager 100 out of engagement with the spring clutch 98 despite the pressure of the Belleville spring 103 until such time as the cam 133 is moved from the position shown in Fig. 6 to the position shown in Fig. 7. When the cam 133 moves to the position shown in Fig. 7, the clutch engager 100 is released by the ball 131 and the Belleville spring 103 is then effective to shift the clutch engager 100 into engagement with the spring clutch 98. The cam 133 is shifted from the position shown in Fig. 6 to the position shown in Fig. 7 by means of an electric solenoid 136, the armature or core 137 of which is pivotally connected to the cam. It will thus be appreciated that the inward movement of the plug 108 by the cam 112 merely cocks or sets the bending head and moves the bending club 91 into engagement with the wire. However, it involves an energizing of the solenoid 136 to shift the cam 133, thus releasing the ball 131 to allow the clutch engager 100 to engage the clutch and thus produce rotation of the sleeve 97, and consequently, rotation of the shaft 90 and the bending club 91. This rotation continues until the lug 123 engages the stop 122 and continues thereafter until the balls 116 are expanded into the recesses 118 freeing the plug 108 for axial movement. The presence of the slot 110 permits of a slight axial movement of the plug 108 relative to the shaft 90. The back pressure of the bent spring wire on the bending club 91 may be such that the friction of the splined connection at 97' will not permit the pressure of the spring 105 to instantly retract the shaft 90 until after the clutch has been disengaged. The slight axial movement of the plug 108 permitted by the slots 110 enables the Belleville spring 103 to expand sufficiently to take off pressure from the pins 101, and thus allow the clutch engager 100 to disengage the clutch. When the clutch has been disengaged sleeve 97 is free to be returned by the return spring 126 and as back torque on the shaft 90 is thus released despite the back pressure exerted by the bent wire, spring 105 is effective to return the shaft 90 and the plug 108 from the position shown in Fig. 7 to the position shown in Fig. 6.

Associated with each bending head unit are two microswitches 138 and 139. The microswitch 138 is operable by means of a roller 140 mounted on a spring 141. The roller 140 is engageable with an arcuate cam 142 adjustably mounted on the frame of the machine outwardly of each of the drums 26 and 27. The length of this cam 142 defines that portion of the rotation of the drums which may be regarded as a work area. In other words, whenever the roller 140 is in engagement with the cam 142 the circuit through the microswitch 138 is closed and conversely, whenever the roller 140 is not depressed by the cam 142, the circuit through the microswitch 138 is broken. Whenever the circuit through the microswitch 138 is broken it is impossible for the solenoid 136 controlled thereby to be energized as will be hereinafter explained. The other microswitch 139 is actuated by a pin 143 that is urged upwardly by a spring 144. This pin functions as a cam follower engageable with a bevel 145 on the plug 108. Whenever the plug 108 is in its outermost position, as shown in Fig. 6, the circuit through the microswitch 139 is closed, but when the plug 108 is pressed inwardly by the cam 112 the spring 144 is effective to lift the pin 143, breaking the circuit through the microswitch 139. It involves a closing of the circuits through both microswitches 138 and 139 to energize the solenoid 136 controlled thereby. Such solenoid may be, but is not necessarily, the same solenoid that is on the bending head unit on which the microswitches 138 and 139 are located. Thus, in the case of the first or most advanced bending head unit on the machine the microswitch 138 may be connected to the solenoid 136 on the same bending head unit so that as soon as the roller 140 engages the cam 142 solenoid 136 may be energized to effect a release of the clutch engager 100. After the first or most advanced bending head unit 33 has completed its operation on the wire or work and the plug 108 of that unit returns from the position shown in Fig. 7 to the position shown in Fig. 6, the bevel 145 causes the microswitch 139 to close. This completes the circuit through the solenoid of the next head that functions on the machine.

In other words, referring to Fig. 16, if the most advanced bending head unit is the bending head 72 the closing of the microswitch 139 of the bending head 72 causes the solenoid 136 of the bending head 73 to be energized and the bending head 73 may then perform its operation on the wire. When the operation of the bending head 73 is completed the closing of the microswitch 139 of the bending head 73 will close a solenoid hereinafter to be described, which will involve a retraction of the holding head 75. In this manner, the bending heads and holding heads are caused to engage the wire in proper sequence and are caused to perform their functions in proper sequence and to release the wire in proper sequence so that each head will not interfere with subsequent operations upon the wire. In this manner, the completion of the work done by each head operates through a microswitch to energize the solenoid of a succeeding head which is to perform a succeeding operation on the wire. However, none of these operations can take place unless the microswitch 138 of a given head is also closed and this occurs only when the roller 140 is in engagement with the cam 142, or in other words, the head is disposed within the work area defined by the length of the cam 142.

In some instances, a given bending head may have to perform the double function of serving as a bending head and as a holding head. Thus, as illustrated in Fig. 16, the bending head 72 operates to twist the lateral bar 74 while the bending head 73 functions as a holding head. After the bending head 72 completes its operation on the lateral bar 74 the bending head 73 then functions as a bending head to bend the lateral bar 76 while it is being held by the holding head 75.

When the rotation of the shaft 90 of a bending head has been completed and the sleeve 97 is reversely rotated by the return spring 126 overrunning or overturning of the sleeve 97 by the return spring 126 is prevented by lug 146, see Fig. 9, on a ring 147 which is pinned as by pins 148 to the sleeve 97 engaging an adjustable stop 149 that is adjusted by means of set screws 150. When the lug 146 engages he stop 149, the recess 132 in the clutch engager 100 is disposed opposite the ball 131 so that the ball may be forced therein by the cam 133 actuated by the spring actuated plunger 135. As the clutch engager is pinned to the sleeve 97 by the pins 101 it is held against rotation relatively to the sleeve and the ball 131 on entering the recess functions as a key or lock, holding the sleeve 97, the shaft 90, and the bending club 91 against rotation until such time as the solenoid 136 is energized. Consequently, by reason of this keying effect of the ball 131 the club 91 of the bending head 73 will be held against rotation until its solenoid 136 is energized by the closing of the microswitch 139 of the bending head 72.

The details of construction of a holding head unit are illustrated in Fig. 12, wherein there is a shaft 160 having a club 161 thereon. This shaft has a splined or feathered connection at 162 with the interior of a sleeve 163. The sleeve 163 provides a spring seat for a compression spring 164 which is constantly effective to urge a plug 165 outwardly so as to be engageable by the cam 112. This plug also is preferably equipped with a roller 166 which engages the cam. The plug 165 is pinned to the shaft 160 by a diametrical pin 167. On the exterior of the plug there is an annular groove 168 which, when the plug 165 is forced inwardly by the cam 112, is adapted to partially receive balls 169 disposed in apertures in the sleeve 163. These balls are surrounded by a ring 170 having recesses or sockets 171, see Fig. 13.

As will be observed from an inspection of Figs. 13 and 14, the sockets 171 are so shaped that they present inclined or camming surfaces toward the balls so that the pressure exerted by the spring 164 constantly causes the plug 165 to move in an axial direction urging the balls 169 outwardly and against the inclined walls of the sockets 171. In other words, the spring 164 is constantly effective to urge the balls 169 outwardly into the sockets 171. Such action, however, can only occur when the ring 170 is free to move from the position shown in Fig. 13 to the position shown in Fig. 14, and in so moving, the ring 170 loads or stresses a torsion spring 172. The torsion spring 172 when free to do so, always urges the ring 170 from the position shown in Fig. 14 to the position shown in Fig. 13 with relation to the sleeve 163. The torsion spring has one end engageable with a shoulder on the side of the ring 170 and the other anchored on a collar 174 that is rigidly mounted on the sleeve 163. The sleeve 163 is locked against rotation relative to the housing of the holding head unit by means of a key 175. On the exterior of the ring 170 there is a recess 176 which corresponds to the recess 132 on the bending head units. This recess is adapted to partially receive a ball 177 actuated by a cam 178 which is urged into the position shown in Fig. 12 by the spring actuated plunger 179. The cam 178 can be retracted by the core or armature 180 of a solenoid 181 which corresponds to th solenoid 136 of the bending head unit.

Each holding head unit is similarly equipped with two microswitches 182 controllable by the roller 183 which engages the cam 142, and a second microswitch 184 corresponding to the microswitch 139 which is actuated by the pin 184' engageable by the bevel 185 on the plug 165. When a bending head unit traverses the cam 112, the plug 165 is pressed inwardly into the position shown in Fig. 12, advancing the club 161 into engagement with the wire and compressing the spring 164. When the groove 168 is disposed opposite the balls 169 spring 172 is effective to rotate the ring 170 and force the balls 169 into the groove 168, thus locking the plug 165 in its innermost position as illustrated in Fig. 12. In such position club 161 is locked against rotation and serves to hold the wire while it is being acted upon by an adjoining or adjacent bending head. When the operation of the bending head preceding the holding head is completed its switch 139 causes an energizing of the solenoid 181 retracting the cam 178 and allowing the ball 177 to move out of the recess 176. This frees the ring 170 so that it may rotate on the sleeve 163. Consequently, the wall of the groove 168 is effective on the balls 169 to force the balls out into the recesses 171 and as a necessary incident, rotates the ring 170 from the position shown in Fig. 13 to the position shown in Fig. 14. When the balls thus release the plug 165 the spring 164 is effective to shift the plug 165 and the shaft 160 into retracted position disengaging the wire. Engagement of the bevel 185 with the pin 184' throws the microswitch, thus causing the solenoid 136 or 181, as the case may be, of the next succeeding head to become energized.

Around one end of the shaft 17 there is stationarily mounted in the coaxial relationship therewith a section 190 of insulating material on which there are three stationary commutator rings 191, 192, and 193. These rings are engaged, respectively, by brushes 194, 195, and 196. The brushes are in turn mounted on a rotary insulating housing 197 which is caused to rotate with the drums by means of a link 198 connecting the housing to a transversely extending bar 199 connected to the drums. One of the brushes 196 is electrically connected to the contactors of the microswitches 138 on all of the bending heads and the microswitches 182 on all of the holding heads.

In effect, brush 196 is connected to the contactors of the microswitches 138 and 182 so that all of these switches are in parallel. Brush 195 is connected to the contactor of microswitch 139 or the contactor of microswitch operable by the pin 184', whichever the case may be of the leading head, it being understood that in some instances the leading head on the drums may be a bending head and in other instances the leading head may be a holding head. The microswitches 139 and those operable by the pin 184' are, in effect, connected in series. As illustrative of this arrangement, Fig. 17 illustrates only two heads, the first head being a bending head and having a microswitch 139 and the second being a holding head having a microswitch 184. In this instance, the holding head shown is the last of the entire series of bending heads and holding heads. The throwing of the microswitch 139 from the position shown on Fig. 17 is necessary in order to energize the solenoid 181 or 136 as the case may be of the succeeding head, and similarly, the throwing of the microswitch 139 or 184, as the case may be, of the succeeding head is necessary in order to energize the solenoid 136 or 181 of the following head. The contact of the last of all of the heads on the drums is connected to the brush 194, as shown on Fig. 17.

The hydraulic circuit from the pump 12 to the two hydraulic motors 14 and 15 is controlled by a solenoid valve 200 which has three solenoids indicated respectively at 201, 202, and 203, see Fig. 17. When the solenoid 201 is energized this is effective to close the hydraulic circuit, preventing flow from the pump 12 to the motors and in effect hydraulically locking the motors against rotation. When the solenoid 202 is energized the hydraulic circuit is partially opened so that the motors 14 and 15 will be driven at a normal operating speed. When the solenoid 203 is energized the valve opens the hydraulic circuit to the greatest extent to cause the motors 14 and 15 to be driven at high speed. The purpose of having a high speed operation in addition to the normal speed is to take care of situations wherein the length of wire being bent is relatively short, and consequently occupies only a small fraction of the circumference around the drum. Under these circumstances when the bending operation on the wire has been completed, instead of merely allowing the drums to rotate at normal speed back to a starting position where an additional length of wire is received the drums are rotated at high speed so as to quickly return them to their starting positions after the operation on the preceding length of wire has been completed.

Referring to Fig. 17 on which various parts previously referred to have been located by means of their reference characters the machine is supplied with current from a suitable supply source, the leads of which are indicated at 204 and 205. One of these leads has a control switch 206. These leads are connected to a transformer 207, the secondary of which is connected to a rectifier 208 which converts the alternating current into direct current. A condenser 209 is connected across the rectifier to smooth out the rectified current. One line from the rectifier is connected to the ring 192 and the other line is connected to the ring 193.

One end of each of the solenoids 201, 202, and 203 is connected to the incoming lead 204. Each of these solenoids has associated therewith a relay, the windings of which are indicated respectively at 210, 211, and 212. The armatures of these relays carry contacts. The armature of the relay 210 has contacts 213 and 214. These are normally in engagement with contacts 215 and 216 as the armature is spring biased in an upward direction as viewed in Fig. 17.

When the solenoid 210 is energized, however, the armature is actuated to disengage contacts 215 and 216 and to engage contacts 217 and 218. In a similar manner, the armature of relay 211 has contacts 219 and 220 normally biased upwardly to engage contacts 221 and 222. When the solenoid of this relay is energized, contacts 219 and 220 will disengage contacts 221 and 222 and engage contacts 223 and 224. Likewise, the armature of relay 212 has contacts 225 and 226 normally urged into engagement with contacts 227 and 228. However, when the relay is energized contacts 227 and 228 will be disengaged and contacts 229 and 230 will be engaged. Contacts 218, 224, and 230 are connected to the solenoids 201, 202, and 203, respectively, of the solenoid valve. Contacts 214, 220, and 226 on the armature of the relays 210, 211, and 212 are connected to the incoming lead 205 of the alternating current source of supply. Consequently, when contact 214 engages contact 218 solenoid 201 will be energized to throw the solenoid valve that controls the hydraulic circuit into its closed or shut-off position. When contact 220 engages contact 224 solenoid 202 will be energized to operate the machine at normal speed. When contact 226 engages contact 230 solenoid 203 will be energized to operate the machine at high speed.

A conductor 231 connects the lead from the rectifier 208 to the ring 193 with the contact 213. This conductor is also connected by means of conductor 232 to the contactor 233 of the microswitch 64 which is actuated by the cam 60. This contactor is engageable with two contacts 234 and 235. It engages the contact 234 when the cam 60 is in its lowermost position, but when the cam is moved upwardly contactor 233 disengages contact 234 and engages contact 235. Contact 234 is connected by conductor 236 to the one side of the relay 212 and the other side of this relay is connected by conductor 237 to the ring 191. Contact 235 is connected by conductor 238 to the contactor 239 of the microswitch 48 which is actuated by the latch 45. This contactor is engageable with two contacts 240 and 241. It engages the contact 241 when wire is present to shift the latch 45 into the position shown in Fig. 2. However, when no wire is present and the spring 47 is able to return the latch, contactor 37 disengages the contact 241 and engages the contact 240. A conductor 242 connects the contact 241 with the contacts 223 and 225, respectively. Contact 240 is connected to one side of relay 210 and a conductor 243 connects the other side of this relay with one side of relay 211 and to conductor 244 that is connected to the other lead from the rectifier 208.

As the machine starts operation cam 60 is in its uppermost position so that contactor 233 is in engagement with contact 235. As the wire engages the latch 45 it causes the contactor 239 to engage the contact 241. Under these circumstances, current may flow from one side of the rectifier 208 through conductor 231, 232, contactor 233, contact 235 to contactor 239. This contactor which has been caused to engage contact 241 due to the shifting of the latch 45 enables current to flow through 242 to contact 225. This contact is in normal engagement with contact 227, and consequently, current may flow through contacts 225 and 227 through relay 211 and conductor 244 to the other side of the rectifier 208, thus completing the circuit through the normal speed relay 211. This relay, on being energized, causes its contacts 219 and 220 to disengage contacts 221 and 222 and to engage contacts 223 and 224, respectively. The engagement of contacts 220 and 224 closes the circuit through solenoid 202 so that the solenoid valve is shifted to its normal speed position, causing the machine to operate at normal speed. Of course, as the drums commence their rotation they quickly permit the cam 60 to descend which throws the contactor 233 from contact 235 to contact 234. This would open the circuit through the relay 211 if it were not for the fact that current may also flow through conductor 231 to contact 213 which is in normal engagement with contact 215. Consequently, even though contactor 233 disengages contact 235 current may flow from conductor 231 through contacts 213 and 215, the latter of which is electrically connected to contact 219 which is in engagement with contact 223 due to the fact that relay 211 has been energized. When contacts 219 and 223 are in engagement current from 231 may flow therethrough to contact 225 which is in normal engagement with contact 227, and consequently the circuit through relay 211 is maintained despite the fact that contactor 233 has disengaged contact 235. In this manner, once the machine has been started and the relay 211 has been energized, it will continue to be energized despite the fact that cam 60 is permitted to fall.

When the drums start rotating they consecutively carry the bending heads and holding heads past the cams 112 which cams engage the bearings 111 on the bending heads and the bearings 166 on the holding heads to advance their clubs 91 and 161, respectively, into engagement with the sides of the wire. The advancement of the plugs 108 of the bending heads permits the pins 143 to be elevated by their springs 144 so that the contactors 245 engage contact 246 which is connected to one side of the solenoid 136. In a similar manner, in the case of the holding heads, when their plugs 165 are advanced their pins 184 may be elevated so that their contactors will engage contacts 248 which are connected to one side of their respective solenoids 181. Continued rotation of the drums enables the roller 140 on each bending head to engage the cam 142 to swing the contactor 249 of the microswitch 138 to engage the contact 250. Similarly, the roller 183 on each holding head will engage the cam 142 and will cause the contactor 251 of each microswitch 182 to engage the contact 252.

Fig. 17 merely shows the first and last heads in the wiring diagram, one being a bending head and the other being a holding head. It will be understood, however, that other bending heads and holding heads will normally be disposed between the first and last heads shown. However, the sequence of operation may be understood from this diagram.

When the plug on the first head is advanced to allow the contactor of the microswitch 139 to engage the contact 246 and the roller on the first head has engaged the cam 142 to cause the contactor 249 of the microswitch 138 to engage the contact 250, current may flow through the solenoid 136 which causes the ball 131 to release the clutch engager 100 and the bending head then proceeds with its cycle of operation as previously described. When the bending head completes its cycle of operation and the plug 108 returns to its initial position, the bevel 145 depresses the pin 143 so that the contactor of the microswitch 139 is shifted from engagement with contact 246 into engagement with contact 253. This contact is in turn connected to the contactor of the next succeeding head which, as shown in Fig. 17, is not only a holding head but also the last head on the drums. A circuit from the rectifier is then completed through contactor 251, contact 252, solenoid 181, contact 248, contactor 247, contact 253, and contactor 245 so that solenoid 181 is energized to effect a release of ball 177. In this manner, the various heads on the drums are caused to be consecutively released by their respective solenoids 136 and 181 and the completion of the cycle of each head is effective to energize the solenoid of the succeeding head that is next to perform an operation on the wire. By this arrangement, even though the various heads may be located at different positions on the drums with their sequence of operation dependent on their location on the drums by merely connecting the microswitches of preceding heads to the solenoids of the heads next to function a proper sequence of operation can be obtained.

In the usual situation, the bending heads and holding heads will be arranged somewhat as is depicted in Fig. 16, wherein it will be observed that the holding heads 86 and 87 are not disposed opposite bending heads. These holding heads merely serve to hold the center portion of the wire section while it is being acted upon near its ends by the bending heads. When the last bending operation is completed which in this illustration is the bending of the lateral bar 84 by the bending head 83, the return of the plug 108 of the bending head 83 causes its bevel 145 to throw its microswitch 139 which closes the circuit through the solenoid 181 of the holding head 85. When this solenoid is energized the holding head 85 is immediately retracted and allowed to disengage the wire. The return of the plug 165 of the holding head 85 causes its microswitch, actuated by the button 184, to be thrown, energizing the solenoid 181 of the head 86 so that the holding head 86 immediately releases the wire section. The return of its plug likewise energizes the solenoid 181 of the holding head 87 so this holding head also disengages the wire, thus entirely freeing the wire and allowing it to drop from between the drums.

In actual practice the successive disengagements of the holding heads 85, 86, and 87 is so rapid that the disengagement of these three holding heads from the wire appears to be simultaneous.

As the rollers 140 and 183 on the bending and holding heads progressively leave the cam 142 they progressively open their microswitches and when the last head completes its cycle of operation the return of its plug causes a shifting of the contactor of its microswitch. Thus, as depicted in Fig. 17, if the last head is a holding head the return of its plug causes the contactor 247 of its microswitch to disengage contact 248 and to engage contact 254. Contact 254 is connected to the brush 194 and through this brush to the ring 191 which is connected to the relay 212. Consequently, when the last head has completed its cycle of operation a circuit is established through conductor 231, conductor 232, contactor 233, contact 234, conductor 236, through relay 212, through ring 191, brush 194, contact 254, contactor 247, and all of the other contactors of the various heads back to the contactor 245 which is connected to the other side of the rectifier 208. When the relay 212 is energized, contact 225 disengages contact 227, opening the circuit through relay 211 and contact 226 engages contact 230, causing the solenoid 203 to be energized. This shifts the solenoid valve to a high speed position so that the drums are then rotated at high speed until such time as the cam edge 60 is engaged, which causes a shifting of the microswitch 64. The shifting of the microswitch 64 shifts the contactor 233 to disengage contact 234 and engage contact 235. This opens the circuit through relay 212 which is effective to break the circuit through solenoid 203. If there is no wire being fed into the machine to engage the latch 45 the microswitch 48 has its contactor 239 disengage contact 241 and engage contact 240. This closes the circuit through relay 210 which causes contact 214 to engage contact 218 and energize solenoid 201. When solenoid 201 is energized the control valve is shifted into the off position, causing the machine to stop. On the other hand, if wire is being fed into the machine to actuate the latch 45 contactor 239 of the microswitch 48 remains in engagement with the contact 241, and in lieu of the machine coming to a stop it continues to operate inasmuch as the circuit is completed through contactor 233, contact 235, contactor 239, contact 241, conductor 242, and contacts 225 and 227 through relay 211. Thus, if wire is being fed into the machine at the conclusion of a previous cycle of operation the machine merely continues to operate at normal speed. But, if no wire is being fed into the machine the machine will automatically stop. At the conclusion of each cycle of operation on the wire that is being bent the machine is hastily returned to its starting position by energizing the high speed solenoid 203.

From the above-described construction it will be appreciated that an improved spring forming machine has been designed capable of bending sinuous or zigzag wire into a multiplicity of different shapes. The particular shapes are dependent upon the location of the various bending heads and holding heads on the drums of the carriers. While the bending heads and holding heads herein disclosed have been primarily designed for use on rotatable drums, these bending heads and holding heads are not only susceptible of use on machines of this character but may be used on radically different machines where it is desirable to have the sinuous wire engage, turned or bent about the lateral bars thereof, and then released. The machine is entirely automatic in its operation and may be used in conjunction with machines which produce arched sinuous wire cut to length. The output of such machines may be fed directly into the chute 36, bent to the desired shape, and when the bending operation is completed, the heads all retract, releasing the bent wire which may drop from between the drums.

Various changes may be made in the details of construction without departing from the spirit and scope of the invention as defined by the appended claims.

I claim:

1. In a wire bending machine, a pair of opposed rotary drums, means for rotating the drums, bending heads mounted upon the drums, a stationary gear relatively to which the drums rotate, a rotary gear, means for rotating the rotary gear at a higher speed than that of the drums, and means for establishing a driving connection between some bending heads and the stationary gear and a driving connection between other bending heads and the rotary gear whereby some bending heads may be rotated in one direction by the stationary gear and others may be rotated in the opposite direction by the rotary gear.

2. In a wire bending machine, a pair of opposed rotary drums, means for rotating the drums, bending heads mounted upon the drums, a stationary gear relatively to which the drums rotate, a rotary gear, means for rotating the rotary gear at a higher speed than that of the drums, means for establishing a driving connection between some bending heads and the stationary gear and a driving connection between other bending heads and the rotary gear whereby some bending heads may be rotated in one direction by the stationary gear and others may be rotated in the opposite direction by the rotary gear, and means for causing the driving connections to be established consecutively.

3. In a wire bending machine, opposed sets of bending and holding heads having bending and holding clubs respectively, means for advancing the bending and holding clubs into engagement with the wire to be bent, means for consecutively causing the bending clubs on the bending heads to rotate and thus bend the wire, and means for causing the holding head opposite each bending head that is actuated to release the wire before the succeeding bending head is actuated.

4. A machine for bending an arched section of sinuously formed wire comprising, in combination, a pair of opposed drums, a plurality of bending heads and holding heads mounted on each drum in angularly spaced relationship, said heads being formed with recesses which receive and fit the ends of the sinuous bends, means for feeding the end of the section of the wire to be bent between the drums, means for rotating the drums, means for successively moving the bending and holding heads into engagement with the ends of the sinuous bends of the section as the drums rotate, means operative during the rotation of the drums for rotating the bending heads while in engagement with the ends of the sinuous bends of the section, and means for moving the heads out of engagement with the ends of the sinuous bends of the section during the rotation of the drums after they have performed their function.

5. A machine as defined in claim 4 wherein said means for rotating the bending heads includes sleeves on the bending heads, gear teeth on said sleeves, fixed and movable gear means meshing with all of the sleeves, and clutch means for establishing temporary driving connection between the heads and the sleeves.

6. A machine as defined in claim 5 wherein said gear means comprises a pair of fixed gears each concentrically mounted with respect to and the outwardly of each of said drums, certain of said sleeves being enmeshed with said fixed gears, a pair of rotatable gears each concentrically mounted with respect to and outwardly of each of said drums, the remaining sleeves being enmeshed with said movable gears, and means for driving said movable gears in the same direction and at a speed greater than said drums.

7. A machine as defined in claim 6 having spring means normally urging said clutch means to interengage said sleeves and said heads, restraining means for holding the clutch means out of engagement against the action of said spring means, and means for consecutively releasing the restraining means whereby to cause the bending heads to be consecutively rotated.

8. The invention defined in claim 7 wherein means is provided for automatic disengagement of said clutch means upon at least a partial rotation of said heads in said bending heads.

References Cited in the file of this patent

UNITED STATES PATENTS

| | | |
|---|---|---|
| 2,389,055 | Horton | Nov. 13, 1945 |
| 2,450,876 | Blumensaadt | Oct. 12, 1948 |
| 2,615,478 | Hopkes | Oct. 28, 1952 |
| 2,632,482 | Lincoln | Mar. 24, 1953 |

FOREIGN PATENTS

| | | |
|---|---|---|
| 226,328 | Germany | Sept. 29, 1910 |
| 475,733 | Canada | July 31, 1951 |